(12) United States Patent
Fan

(10) Patent No.: US 7,717,595 B2
(45) Date of Patent: May 18, 2010

(54) BRAKE WARNING APPARATUS FOR BICYCLES

(76) Inventor: Eagle Fan, No. 133, Cheng-Kung 6 St., Chu-Pei City, Hsinchu (TW)

( * ) Notice: Subject to any disclaimer, the term of this patent is extended or adjusted under 35 U.S.C. 154(b) by 0 days.

(21) Appl. No.: 12/209,207

(22) Filed: Sep. 12, 2008

(65) Prior Publication Data

US 2010/0067245 A1 Mar. 18, 2010

(51) Int. Cl.
*B62J 6/00* (2006.01)
(52) U.S. Cl. ........................... 362/474; 362/541
(58) Field of Classification Search ................ 362/473, 362/474, 396, 541; 340/432
See application file for complete search history.

(56) References Cited

U.S. PATENT DOCUMENTS 2,603,701 A * 7/1952 Schadel, Jr. ................ 340/432
6,109,770 A * 8/2000 Choimet et al. ............. 362/473
6,805,473 B2 * 10/2004 Beard ......................... 362/474
7,466,222 B2 * 12/2008 Scott ........................... 340/468
2001/0053081 A1 * 12/2001 Taylor et al. ................ 362/474
2006/0285343 A1 * 12/2006 Okajima et al. ............. 362/473
2009/0032561 A1 * 2/2009 Dacko ......................... 224/441

* cited by examiner

*Primary Examiner*—Jong-Suk (James) Lee
*Assistant Examiner*—Peggy A. Neils

(57) ABSTRACT

A brake warning apparatus for bicycles is provided, including a lighting device and a switch handle, to be installed on the handles of bicycles. The lighting device includes a light case, a lighting unit and a power unit. The light unit includes at least a switch. The switch handle is partially coupled to the inside of the light case and the rod of the switch handle extending outside the light case is located on the path of the movement of the handbrake of the bicycle when braking the bicycle. When the switch handle is pressed by the handbrake, the rod inside the light case will trigger the switch of the lighting unit so that the lighting device will display the pre-defined lighting condition to achieve the warning effect.

6 Claims, 9 Drawing Sheets

BRAKE WARNING APPARATUS FOR BICYCLES

FIELD OF THE INVENTION

The present invention generally relates to a brake warning apparatus, and more specifically to a brake warning apparatus for bicycles to improve the riding safety.

BACKGROUND OF THE INVENTION

Contemporary people usually lead a busy lifestyle lack of physical exercise. As the oil price gets higher and the environmental awareness grows, more and more people turn to bicycles for short distance transportation in addition to conventional recreational or health purpose in order to reduce the energy consumption and carbon-dioxide production.

To provide warning or lighting, most bicycles use a fixed frame and a lighting device. The fixed frame is for fixing a lighting device to the appropriate location on a bicycle, such as the frame, the handle, the back of the seat, and so on. The lighting device provides different lighting conditions, such as blinking, continuous lighting or different color lights for warning or lighting purposes. However, once turned on, the conventional lighting device usually stays in the default lighting condition; thus, lack of interactive or meaningful effects. In addition, when the biker forgets to turn off the lighting device, the battery could use up all the power. Therefore, it is imperative to devise a lighting device that allows interactive warning effects to improve the safety for bicycle riding.

SUMMARY OF THE INVENTION

The primary object of the present invention is to provide an interactive brake warning apparatus for bicycles; that is, when a biker brakes during riding, the lighting device will illuminate to provide warning to improve the safety.

Another object of the present invention is to provide a lighting device for the bicycles. The warning apparatus of the present invention is installed on the handle of the bicycles. The lighting device of the warning apparatus may include a plurality of light bulb sets. Some of the light bulb sets can be used as a brake warning light, the others can be designed to display various lighting conditions; for example, a continuous light for illumination or a blinking light for warning, and so on.

To achieve the above objects, the present invention includes a lighting device, and a switch handle. The lighting device includes a light case, a lighting unit and a power unit. The light case forms a housing space. A part of the light case is made of a transparent shield. The lighting unit is located inside the light case. The light unit includes a circuit board, at least a light bulb, and at least a switch. The light bulb is located on the circuit board, positioned correspondingly to the transparent shield of the light case. The power unit is located inside the light case to provide the power for the lighting unit. The switch handle is partially coupled to the inside of the light case and the rod of the switch handle extending outside the light case is located on the path of the movement of the handbrake of the bicycle when braking the bicycle. When the switch handle is pressed by the handbrake, the rod inside the light case will trigger the switch of the lighting unit so that the lighting device will display the pre-defined lighting condition.

The forgoing and other objects, features, aspects and advantages of the present invention will become better understood from a careful reading if a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
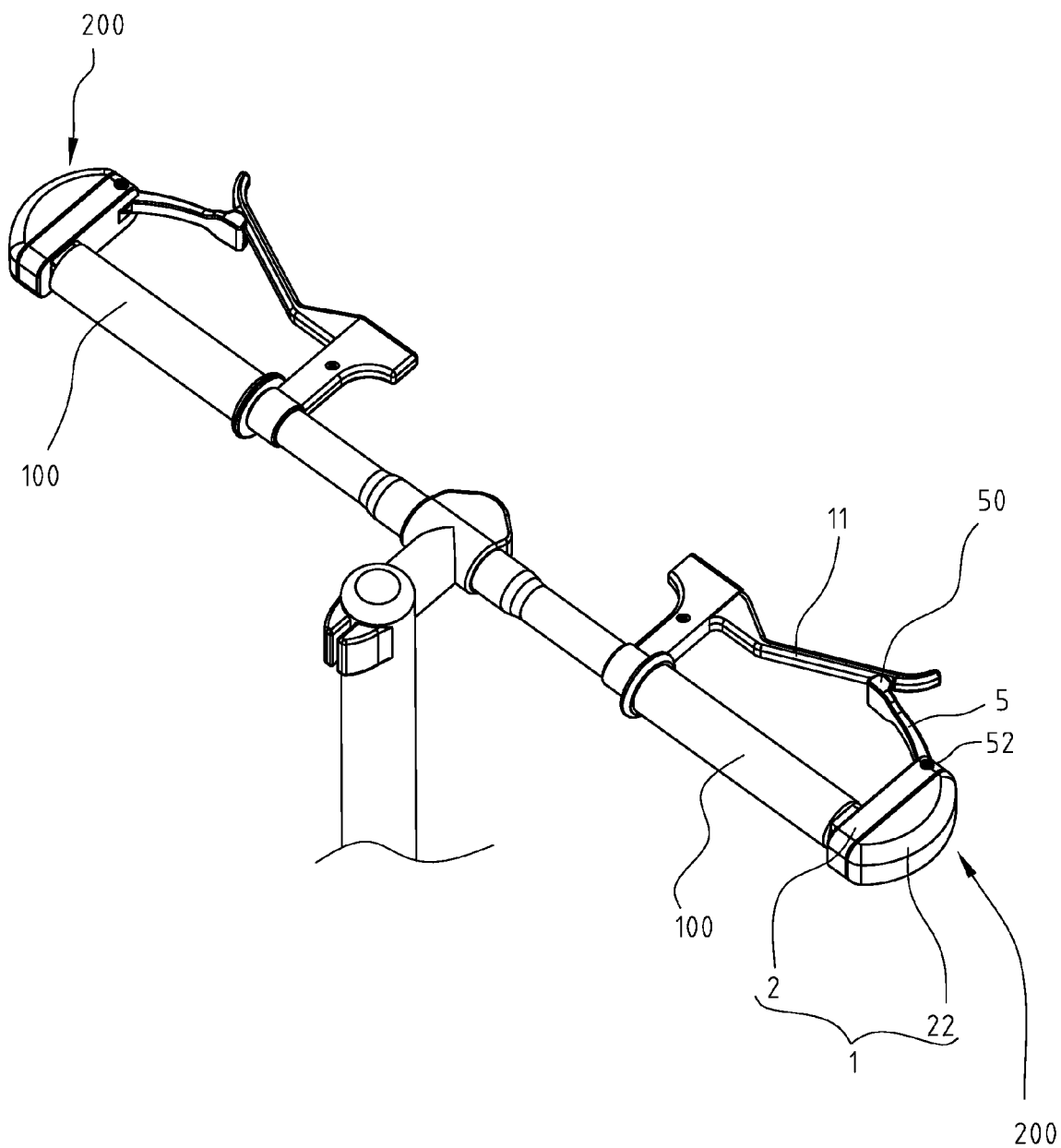
FIG. 1 shows a schematic view of the first embodiment of the present invention.
Figure 2:
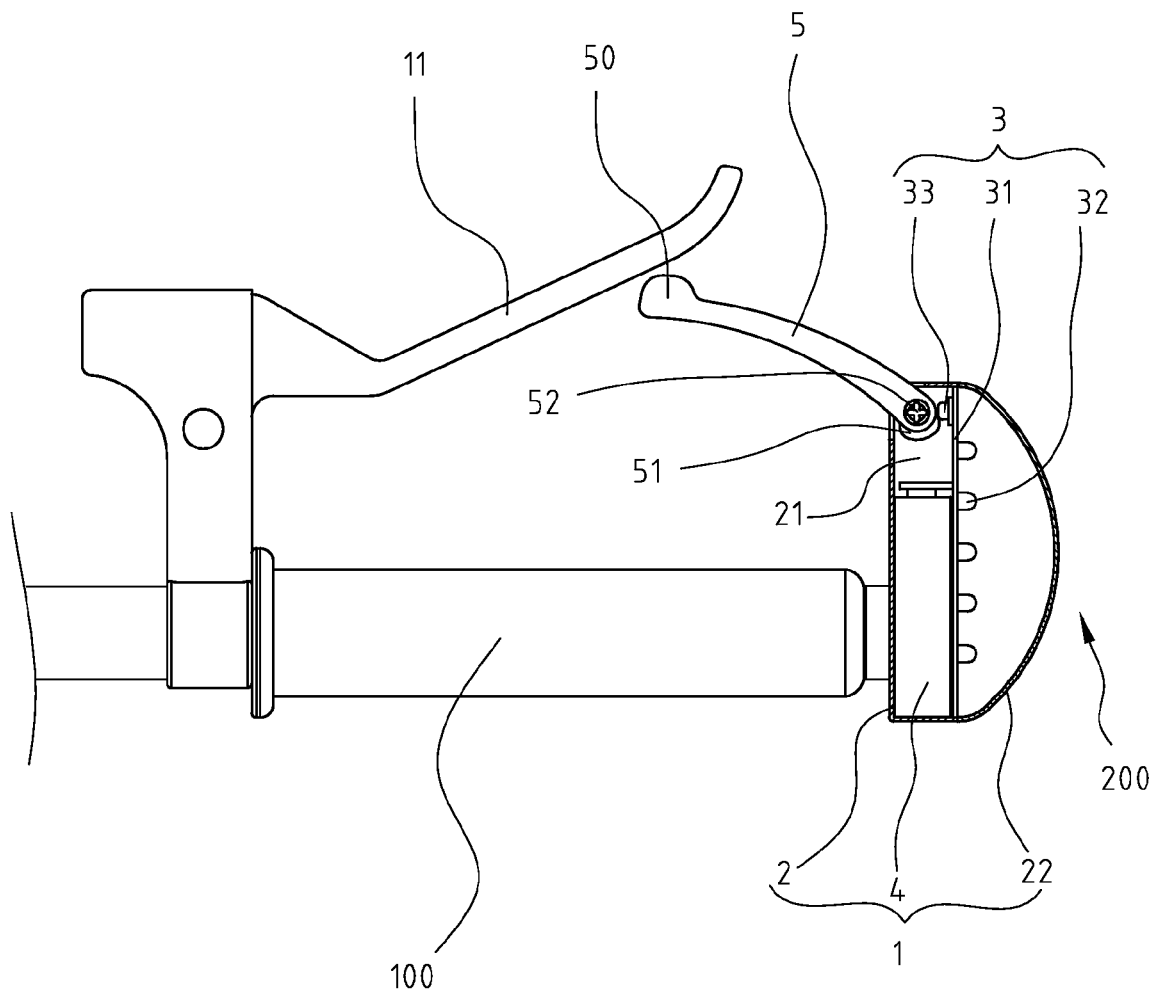
FIG. 2 shows a cross-sectional view of the first embodiment of the present invention.

FIG. 1 and FIG. 2 show a schematic view and a cross-sectional view of the present invention, respectively. A brake warning apparatus 200 of the present invention is installed on handle 100 of a bicycle. In the present embodiment, brake warning apparatus 200 is located on the vertical surface on the end of handle 100. A bicycle will have a brake warning apparatus 200 installed on the left and right ends of handle 100, respectively. Brake warning apparatus 200 includes a lighting device 1 and a switch handle 5. Lighting device 1 includes at least a switch 33. Switch handle 5 is partially coupled to the inside of lighting device 1, and the coupling position is located close to switch 33. The majority of the rod of switch handle 5 is outside of lighting device 1, and is located on the path of the movement of handbrake 11 of handle 100 during braking the bicycle. When switch handle 5 is moved by handbrake 11, switch 33 is triggered so that the lighting device will generate the pre-defined lighting condition, such as continuous illumination or periodical blinking.

Lighting device 1 includes a light case, a lighting unit 3 and a power unit 4. Light case 2 forms a housing space 21 for housing aforementioned components. A part of light case 2 is made of transparent shield 22. Lighting unit 3 is located inside light case 2. Light unit 3 includes a circuit board 31, at least a light bulb 32, and at least a switch 33. Light bulb 32 is located on circuit board 31, positioned correspondingly to transparent shield 22 of light case 2. Circuit board 31 includes related circuit for controlling the lighting condition of light bulb 32, such as continuous illumination or periodic blinking. Switch 33 is also located on circuit board 31, but is located on different surface from light bulb 32. Power unit 4 includes at least a battery for providing power to lighting unit 3. Switch handle 5 is partially coupled to inside of light case 2, and the coupling position is located near to switch 33. The rod of switch handle 5 extending outside the light case is located on the path of movement of handbrake 11 of handle 100 of the bicycle when braking the bicycle. When switch handle 5 is moved by handbrake 11, the part of the rod of switch handle 5 located inside light case 2 will trigger switch 33 so that light bulb 32 of lighting unit 3 will illuminate to achieve warning effects.

Light bulb 32 of lighting unit 3 is preferably LED, and the LED can be of different colors. The plurality of light bulbs in the present embodiment is only for warning effect and activated by switch 33. However, the use of light bulbs is not limited to the present embodiment. For example, a plurality of light bulbs can be divided into different groups, controlled by different switches. Each group of light bulbs can have different projecting angle; for example, when projecting light towards the front, the light bulbs can act as headlight, the light bulbs blinking toward the sideway can act as warning light.

Figure 3:
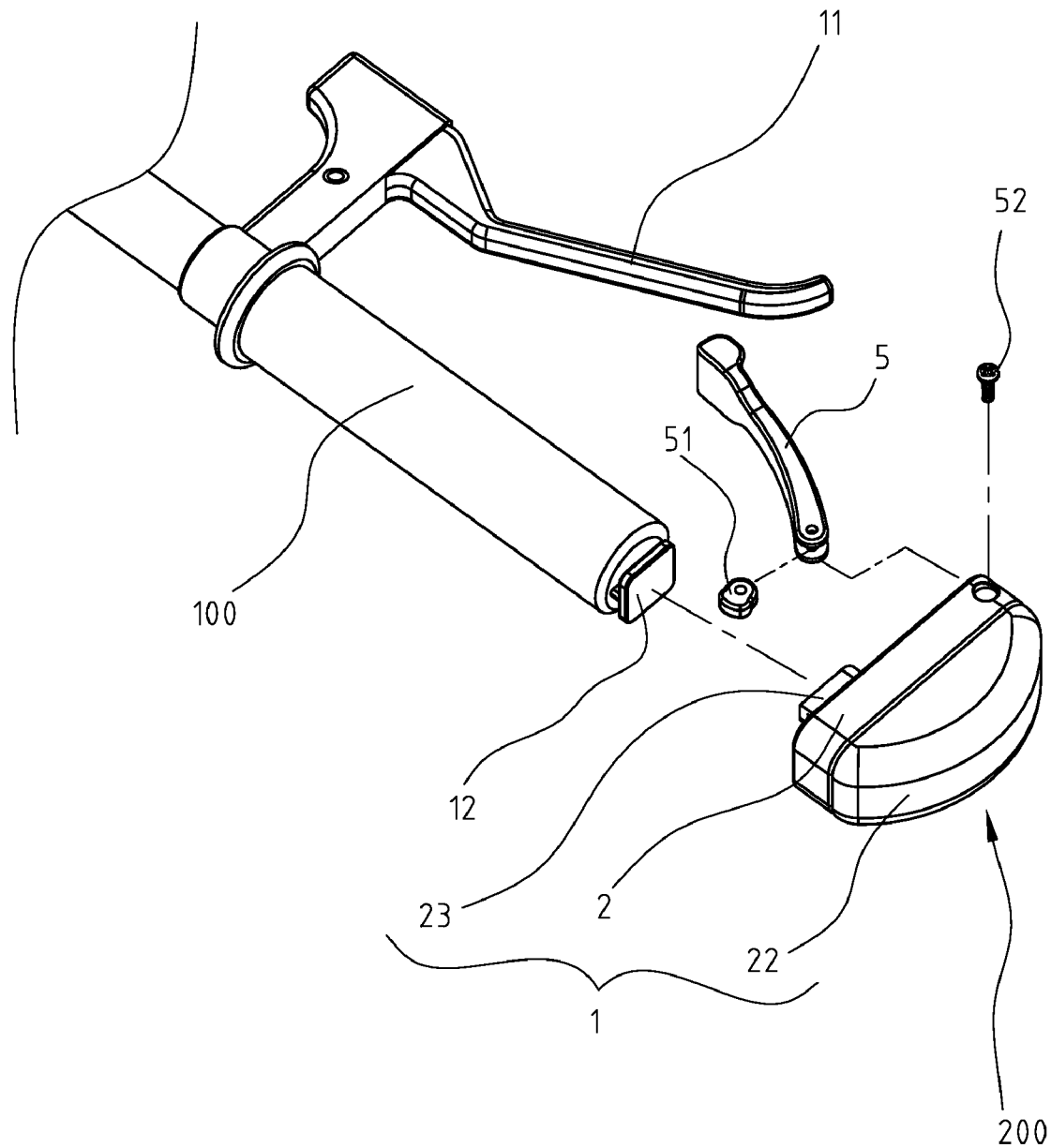
FIG. 3 shows an exploded view of the first embodiment of the present invention.

As shown in FIG. 2, the location of contact end 50 of switch handle 5 is directly related to the timing of the warning light when braking the bicycle. To provide a wider range of applications, the location of contact end 50 of switch handle 5 of the present invention can be adjusted to fit different bicycles as the locations of the handbrake on bicycles may be different. As shown in FIGS. 2 and 3, switch handle 5 further includes a protruding element 51 and a fixed screw 52 at the coupling position inside light case 2. Protruding element 51 has the shape similar to a protruding wheel or a non-centric wheel. Fixed screw 52 fixes protruding element 51 to switch handle 5. When switch handle is maneuvered, protruding element 5 also rotates and protruding element 51 triggers switch 33. To adjust the location of contact end 50 of switch handle 5, the first step is to unfasten fix screw 52 to release the linkage movement relation between protruding element 51 and switch handle 5. Then, the second step is to rotate switch handle 5 to the desired angle using coupling point as rotation center. It is noteworthy that protruding element 51 does not rotate with switch handle 5 at this time. After the adjustment, fixed screw 52 is re-fastened so that switch handle 5 and protruding element 51 can rotate synchronously again.

For convenience of use, brake warning apparatus 200 of the present invention can be removed from and re-installed on handle 100. As shown in FIG. 3, the vertical surface close to the edge of handle 100 includes a buckle element 12, and the corresponding side wall of light case 2 includes a buckle seat 23. Buckle seat 23 has a trench (not shown) matching the shape of buckle element 12. Therefore, brake warning apparatus 200 of the present invention can be easily installed by buckling buckle seat 23 to buckle element 12, as well as easily removed from handle 100 when not in use.

Figure 4:
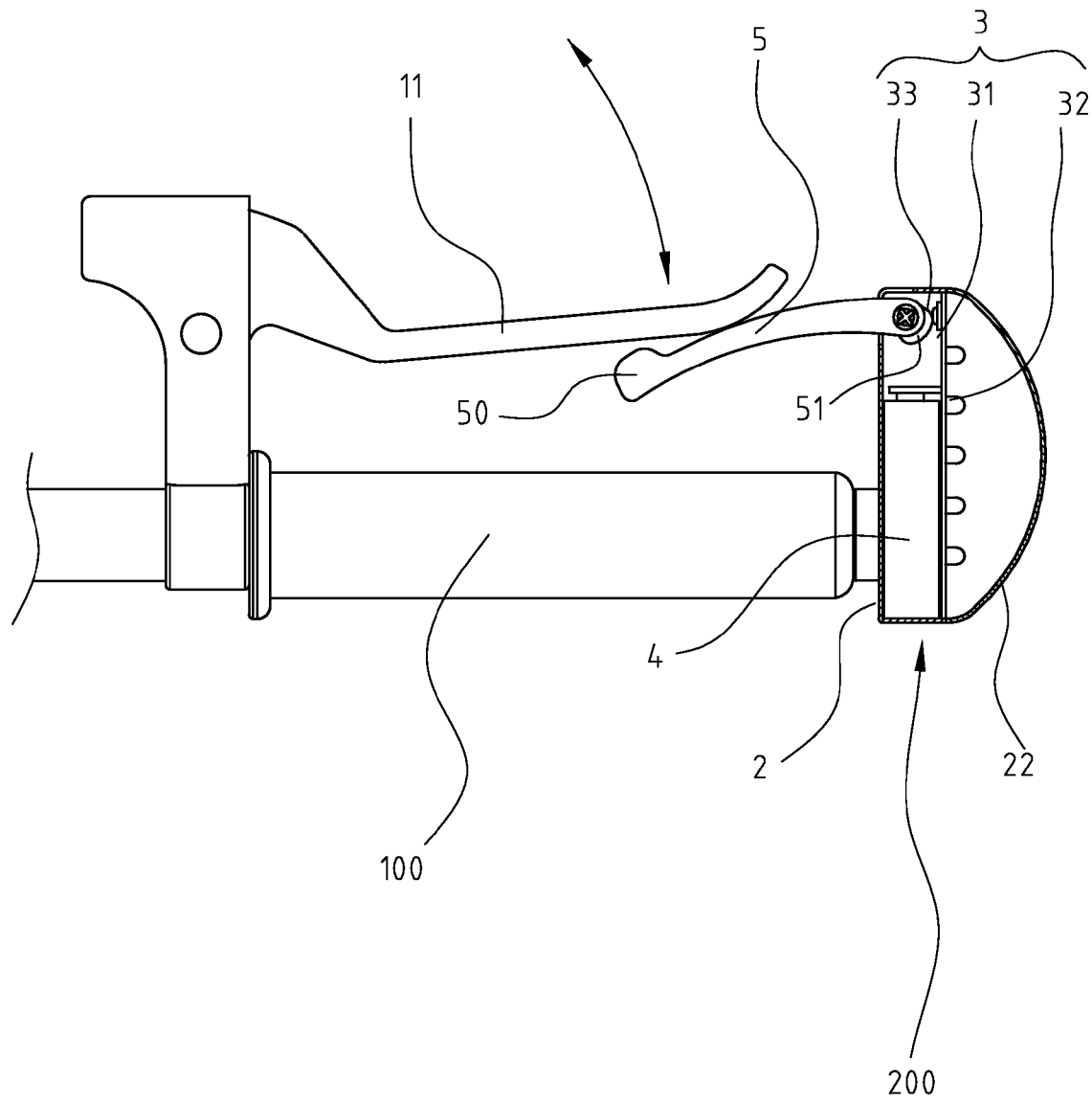
FIG. 4 shows a schematic view of the operation of the first embodiment of the present invention.

As shown in FIGS. 2 and 4, in the normal condition, contact end 50 of switch handle 5 is located on the path of the movement of handbrake 11. The location of contact end 50 is adjustable. A shown in FIG. 4, when handbrake 11 is pressed, contact end 50 of switch handle 5 is triggered and protruding element 51 inside light case 2 also rotates with switch handle 5 to touch switch 33, which turns on a plurality of light bulbs 32 to generate appropriate warning effects. Therefore, the present invention is a brake warning apparatus for bicycle operating synchronously with the handbrake.

Figure 5:
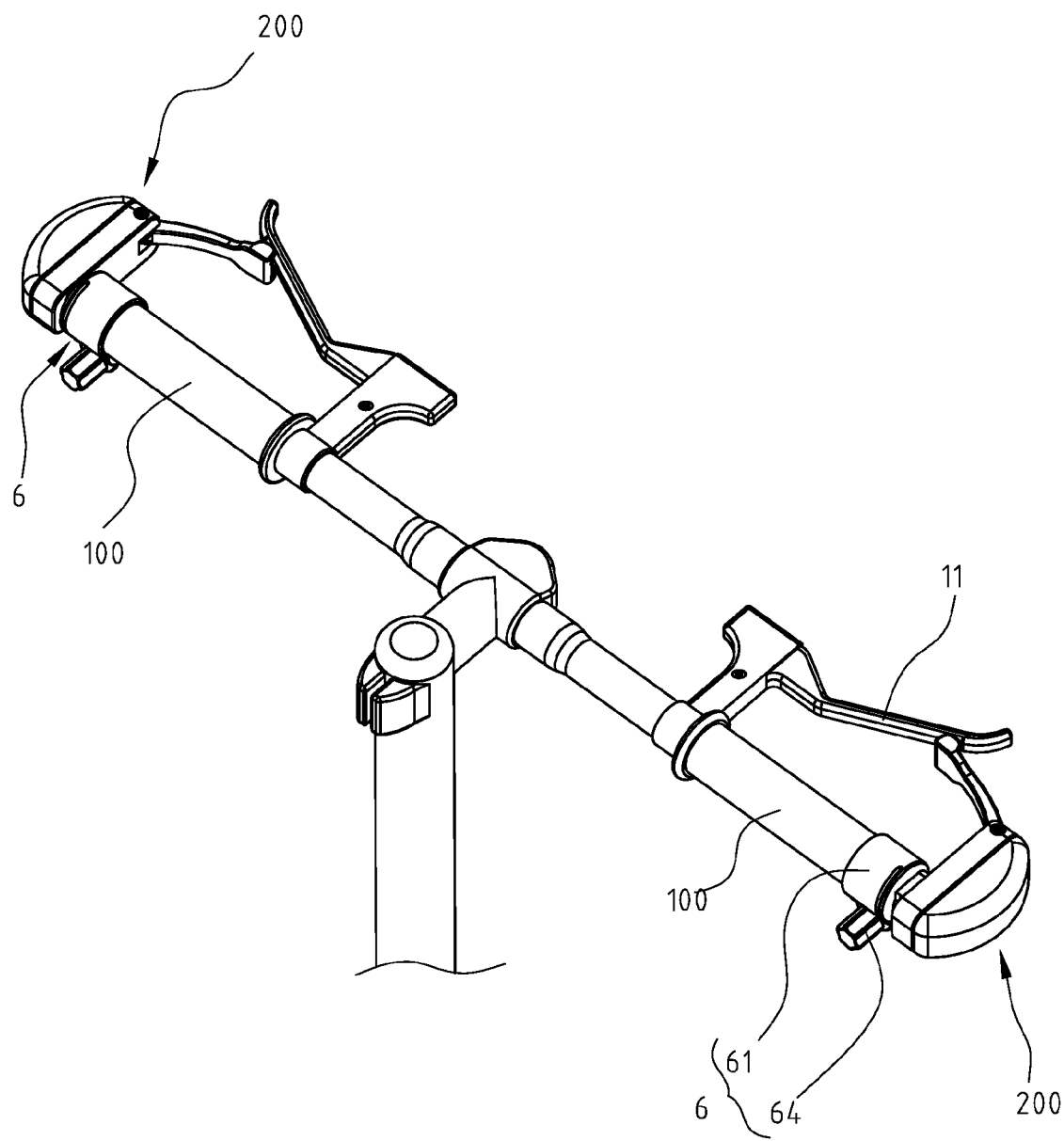
FIG. 5 shows a schematic view of the second embodiment of the present invention.
Figure 6A:
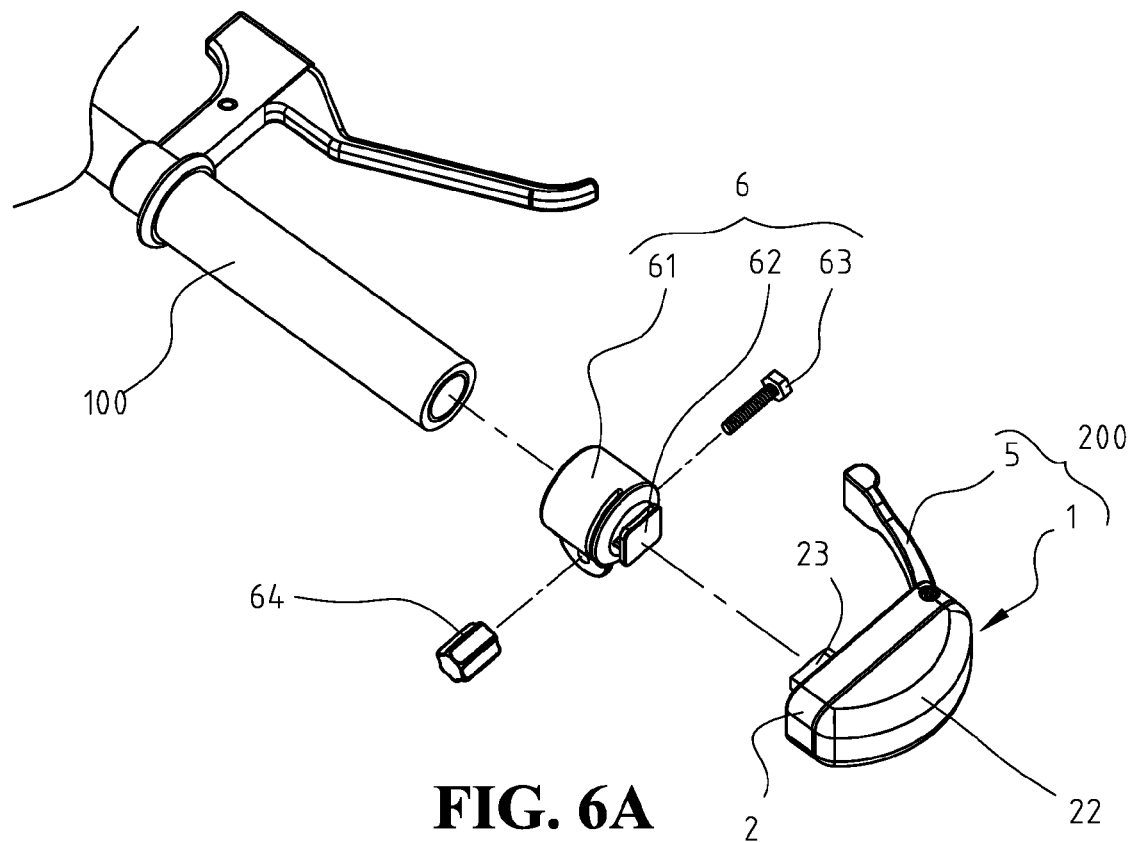
FIG. 6A shows an exploded view of the second embodiment of the present invention.
Figure 6B:
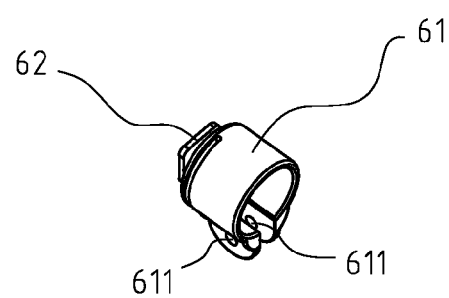
FIG. 6B shows a schematic view of the sheath element of the fixed unit of the second embodiment of the present invention.

FIG. 5 shows a schematic view of the second embodiment of the present invention and FIG. 6A shows an exploded view of the embodiment of FIG. 5. The second embodiment further includes a fixed unit 6 so that brake warning apparatus 200 of the present invention can be installed on different handle 100. Fixed unit 6 includes a sheath element 61, a buckle element 62, a screw 63 and a screw cap 64. As shown in FIG. 6B, sheath element 61 is partially engaged to buckle element 62. Sheath element 61 is a belt of C-shape with a hole at the center area to match the outer perimeter of handle 100. The bottom of sheath element 61 further includes two holes 611. Screw 63 penetrates holes 611 of sheath element 61. Screw cap 64 includes inner screw teeth (not shown). When screw cap 64 is fastened to screw 63, sheath element 61 is fastened to handle 100. Buckle element 62 has a shape matching the shape of buckle seat 23 of light case 2. Therefore, brake warning apparatus 200 of the present invention can be repeatedly removed or re-installed on fixed unit 6, and with fixed unit 6, the present invention can be installed on different types of bicycle handles.

Figure 7:
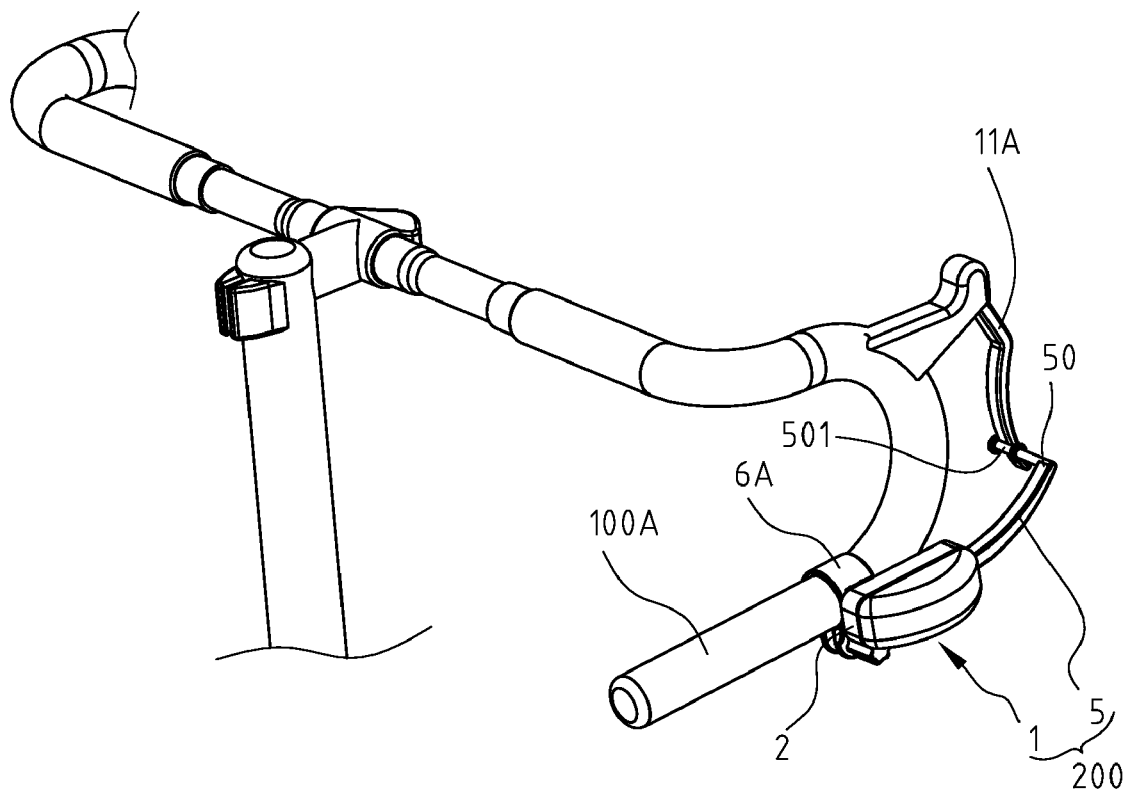
FIG. 7 shows a schematic view of the third embodiment of the present invention.
Figure 8:
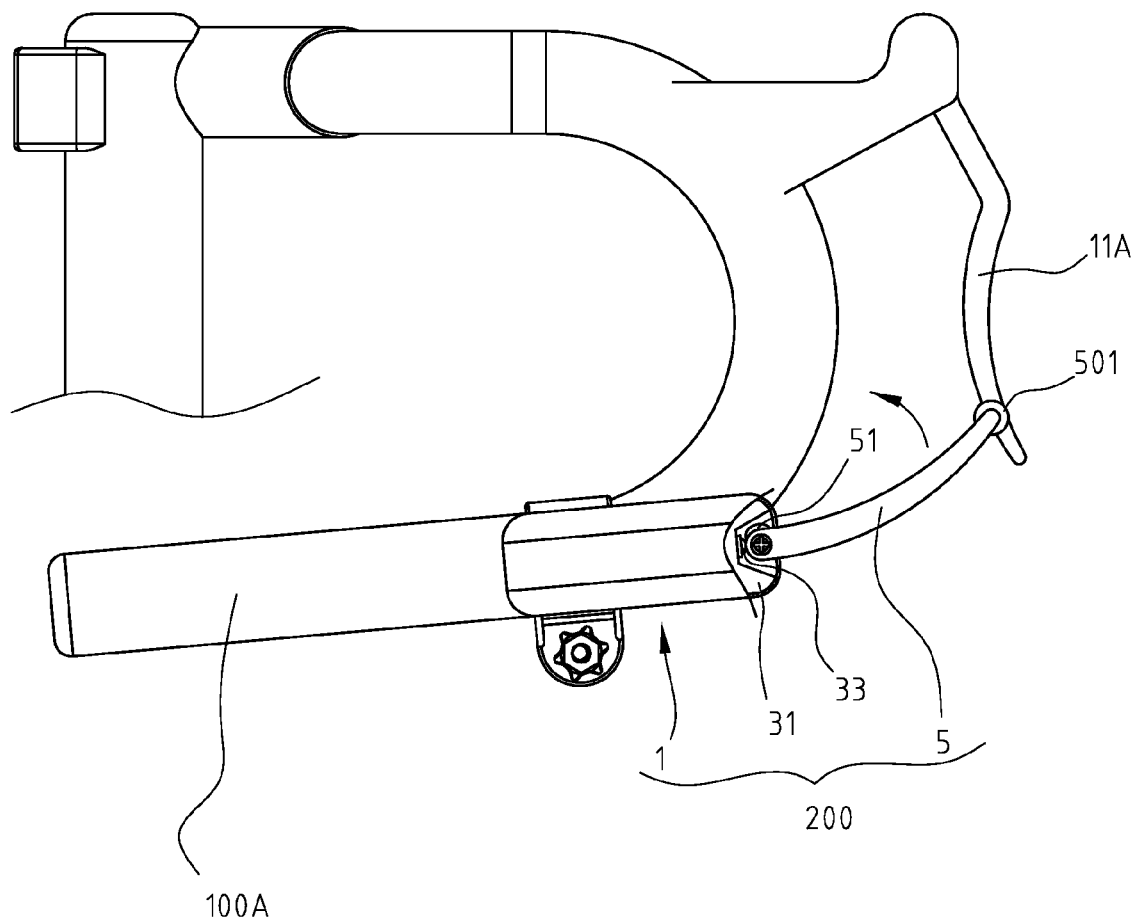
FIG. 8 shows a partial cross-sectional view of the third embodiment of the present invention.
Figure 9:
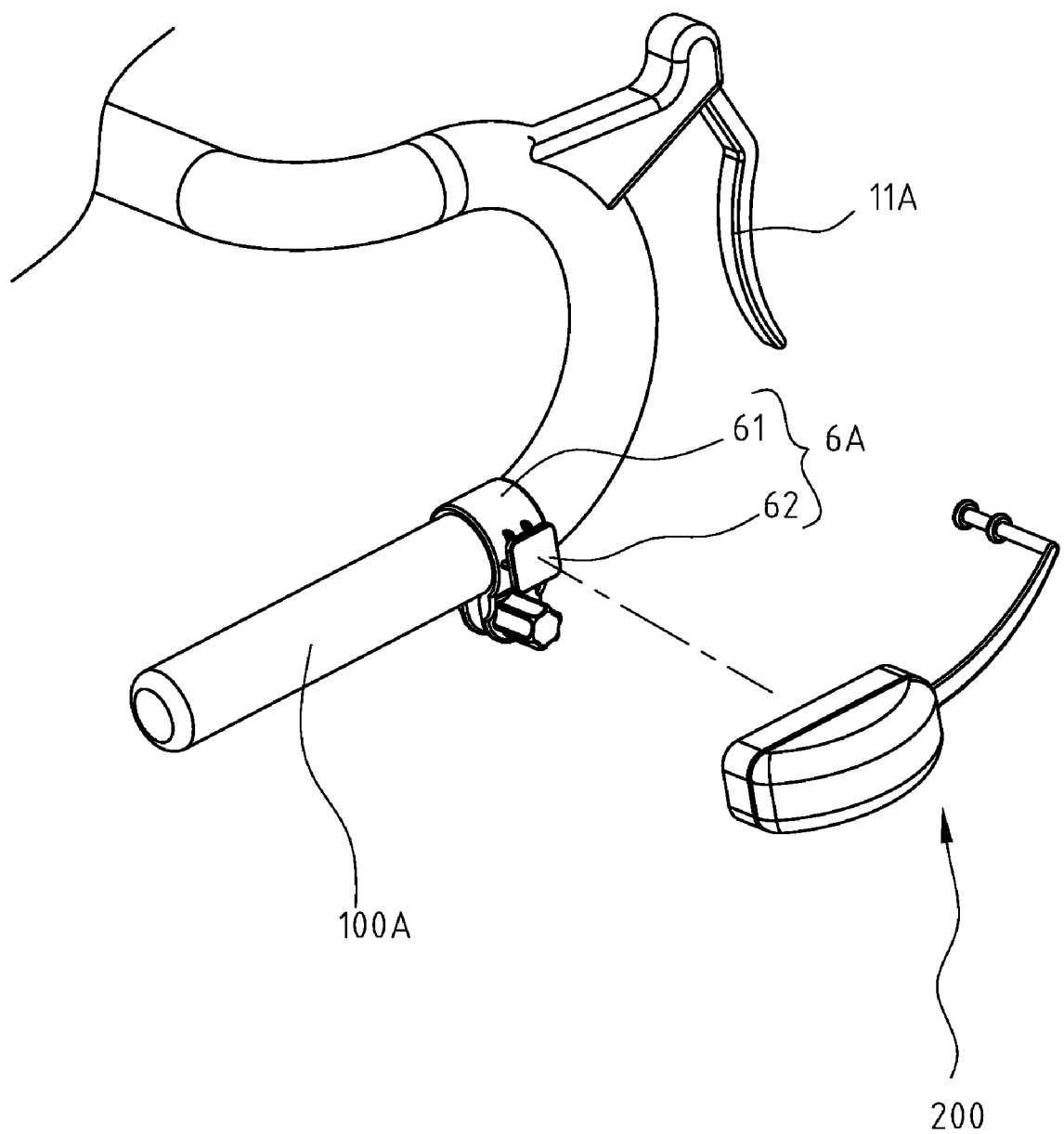
FIG. 9 shows an exploded view of the third embodiment of the present invention.

FIGS. 7 and 8 shows a schematic view and a cross-sectional view of the third embodiment of the present invention, respectively. In this embodiment, the present invention is applied to a different type of handle. The figure only shows one side of the handle. In this embodiment, brake warning apparatus 200 also includes a lighting device 1 and a switch handle 5. As shown in FIG. 8, the different of this embodiment is the direction of the coupling of switch handle 5 inside lighting case 2 and the direction of switch 33 on circuit board 31. In addition, contact end 50 of switch handle 5 further includes an extended rod 501, also located on the path of movement of handbrake 11A. When switch handle 5 is maneuvered by handbrake 11A, protruding element 51 of switch handle 5 also rotates and triggers switch 33 to illuminate the light bulbs of lighting unit. As shown in FIG. 9, brake warning apparatus 200 uses a fixed unit 6A to be fastened to handle 100A. Fixed unit 6A is similar to fixed unit 6 of FIG. 6, except the location of buckle element 62. In this embodiment, buckle element 62 is located on the outer wall of sheath element 61. This embodiment shows that the present invention is applicable to different types of bicycle handles.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A brake warning apparatus for a bicycle, installed on a handle of said bicycle, comprising:

a lighting device, having a switch; and a switch handle, partially coupled to inside of said lighting device, said switch handle having a rod extending outside said lighting device located on a movement path of a handbrake of said bicycle, and said switch handle triggering said switch to turn on said lighting device when said rod extending outside said lighting device is pressed by said handbrake;

wherein said switch handle further comprises a protruding element at a coupling location inside said lighting device, said protruding element is fastened to said switch handle, and when said switch handle is pressed, said protruding element contacts and triggers said switch.

2. The brake warning apparatus as claimed in claim 1, wherein said lighting device further comprises:

a light case, forming a housing space inside, part of said light case being a transparent shield;

a lighting unit, located inside said light case, further comprising a circuit board, at least one light bulb and said switch, said light bulb located on said circuit board and located correspondingly to said transparent shield; and a power unit, located inside said light case for providing power to said lighting unit.

3. The brake warning apparatus as claimed in claim 2, wherein said power unit has at least one battery.

4. The brake warning apparatus as claimed in claim 2, wherein said light bulb is an LED.

5. The brake warning apparatus as claimed in claim 2, wherein said handle further has a buckle element, said light case of said lighting device has a buckle seat corresponding to said buckle element on an outer wall of said light case, and said buckle element has a shape matching a trench of said buckle seat so that said lighting device can be repeatedly removed from and re-installed to said handle.

6. The brake warning apparatus as claimed in claim 2, further comprising a fixed unit, said fixed unit able to be fastened to said handle, said fixed unit further comprising a buckle element, said light case of said lighting device having a buckle seat corresponding to said buckle element on an outer wall of said light case, and said buckle element having a shape matching a trench of said buckle seat so that said lighting device is able to be repeatedly removed from and re-installed to said fixed unit.

\* \* \* \* \*